(12) United States Patent
Ball

(10) Patent No.: US 7,802,587 B1
(45) Date of Patent: Sep. 28, 2010

(54) FLOAT VALVE AND METHOD

(76) Inventor: Ralph A. Ball, 2612 Peterson Rd., Jefferson, OH (US) 44047

( * ) Notice: Subject to any disclaimer, the term of this patent is extended or adjusted under 35 U.S.C. 154(b) by 282 days.

(21) Appl. No.: 12/072,431

(22) Filed: Feb. 26, 2008

(51) Int. Cl.
*F16K 31/18* (2006.01)

(52) U.S. Cl. .................... 137/421; 137/15.26; 137/434; 137/558

(58) Field of Classification Search ................. 137/409, 137/421, 434, 558, 15.26, 418
See application file for complete search history.

(56) References Cited

U.S. PATENT DOCUMENTS

| | | | |
|---|---|---|---|
| 2,066,315 A | * | 1/1937 | Bauer et al. ................. 137/410 |
| 3,963,041 A | * | 6/1976 | McGillis ..................... 137/410 |
| 4,246,572 A | | 1/1981 | Larsen ........................ 340/501 |
| 4,456,432 A | | 6/1984 | Mannino ........................ 417/2 |
| 6,148,852 A | * | 11/2000 | Osterman .................... 137/391 |

* cited by examiner

*Primary Examiner*—John Rivell
*Assistant Examiner*—Craig Price

(57) ABSTRACT

A valve and method allows efficient closure for a pipe containing liquid. The valve in the preferred form is operated by a float in a sump pit should the sump pump fail to operate. The float is lifted by rising water and an arm attached to the float is supported on rollers when the valve is normally open turns to disengage from the rollers to close the valve. A shaft positioned in the conduit is attached to a cap which reacts to the expansion of a spring to thus close the end of the conduit and prevent further liquid flow therethrough. An audible alarm system sounds as the rising liquid level reaches a water sensor on the valve to warn a homeowner or building occupant. The alarm also sounds when a manual test switch is closed or if the smoke sensor is activated.

13 Claims, 8 Drawing Sheets

US 7,802,587 B1

FLOAT VALVE AND METHOD

FIELD OF THE INVENTION

The invention herein pertains to a valve for closing the end of a pipe which transfers liquid and particularly pertains to a float valve having a roller mechanism and an alarm for closing a drain pipe in a basement sump pit.

DESCRIPTION OF THE PRIOR ART AND OBJECTIVES OF THE INVENTION

Homes and other buildings are often built with basements that are susceptible to moisture problems. Excess drainage water can flood a basement much to the dismay of the home or building owner. In order to counteract flooding, systems have been developed to remove the water from the basement utilizing a sump pump system as shown, for example in U.S. Pat. No. 4,456,432. As seen, water is drained into a sump pit below the basement floor surface where it activates a float valve connected to a sump pump. The sump pump then directs the water from the sump to an outside location through an outlet line to maintain the basement floor in a dry condition. Visual and audible alarms are also standard to warn home owners when the pump is activated or is inoperable, such as during electrical outages. As most sump pumps are electrically powered, great damage can be caused if there is a power outage, mechanical failure of the pump or if circuit breakers trip. Certain sump pumps in the past have been equipped with an auxiliary power backup system to insure power for the pump in the event of power failure. Nevertheless, pump failures can occur even with backup systems, to thereby cause harm and property losses for the home owner.

Therefore, to help eliminate problems and disadvantages of current sump pump systems and to provide safety and security to the home or building owner, the present invention was conceived and one of its objectives is to provide a float valve which will close the drain pipe and prevent water from completely filling and overflowing the sump pit.

It is another objective of the present invention to provide a float valve for quick and simple installation by relatively unskilled persons which includes a conduit for placement over the end of the drain pipe within the sump pit.

It is still another objective of the present invention to provide a method utilizing a float valve which activates a cap to close the drain conduit when excess water is received in the sump pit and an alarm to signal the building occupants.

It is still a further objective of the present invention to provide a method for preventing basement flooding due to failure of a sump pump to operate, regardless of its cause.

It is yet another objective of the present invention to provide a float valve having rollers for smooth, easy operation.

It is yet a further objective of the present invention to provide an alarm to notify the home or building owner that the sump pump is improperly operating, or that smoke is being generated.

Various other objectives and advantages of the present invention will become apparent to those skilled in the art as a more detailed description is set forth below.

SUMMARY OF THE INVENTION

The aforesaid and other objectives are realized by providing a float valve with an electrical powered audible safety alarm attached thereto. The alarm will sound due to smoke activation, pump failure or by pressing a manual test button thereon. The float valve includes a conduit sized to fit the end of a conventional drain pipe located within a basement sump pit. The conduit may be for example, approximately 4-6 inches (10-15 cm) in length and have an interior diameter sized to receive the end of the sump drain pipe. Attached to the conduit in opposing relation are a pair of struts having rollers affixed to their distal ends. A cap positioned on the external end of a spring loaded shaft is sized to tightly seal and close the valve or conduit as needed. The shaft extends through the cap and is attached to a rotatable float arm joined to a float. The arm rests on the rollers of each strut when the valve is open with the cap spaced from the end of the conduit to allow water to drain into the sump pit under normal operating conditions.

In operation, the valve struts are horizontally aligned with the float at approximately three o'clock in a head-on (front) view. While shown horizontally positioned, the float could also be vertically positioned if desired. With the drain pipe above the sump pump, the drain pipe remains open under normal conditions. Typically, a float switch on the sump pump turns the pump on and off as required to maintain the water in the sump pit at a minimum, selected level. Should the sump pump fail, for any of a variety of reasons, the water from the drain pipe will continue to supply the sump pit until such time as the float attached to the float valve is activated. At that time the float on the valve is lifted by the rising water level, causing the float arm to rotate around the shaft axis whereby the arm disengages from the strut rollers. The resilient member on the shaft then expands and the cap attached thereto is urged against the end of the conduit to effectively close the drain pipe and prevent further drainage into the sump pit. Simultaneously therewith the battery operated audible alarm which is electrically connected to a water sensor on the conduit senses the rising water and "makes" a circuit thus causing the alarm to sound to notify the building occupant.

DETAILED DESCRIPTION OF THE PREFERRED EMBODIMENT AND OPERATION OF THE INVENTION

Figure 1:
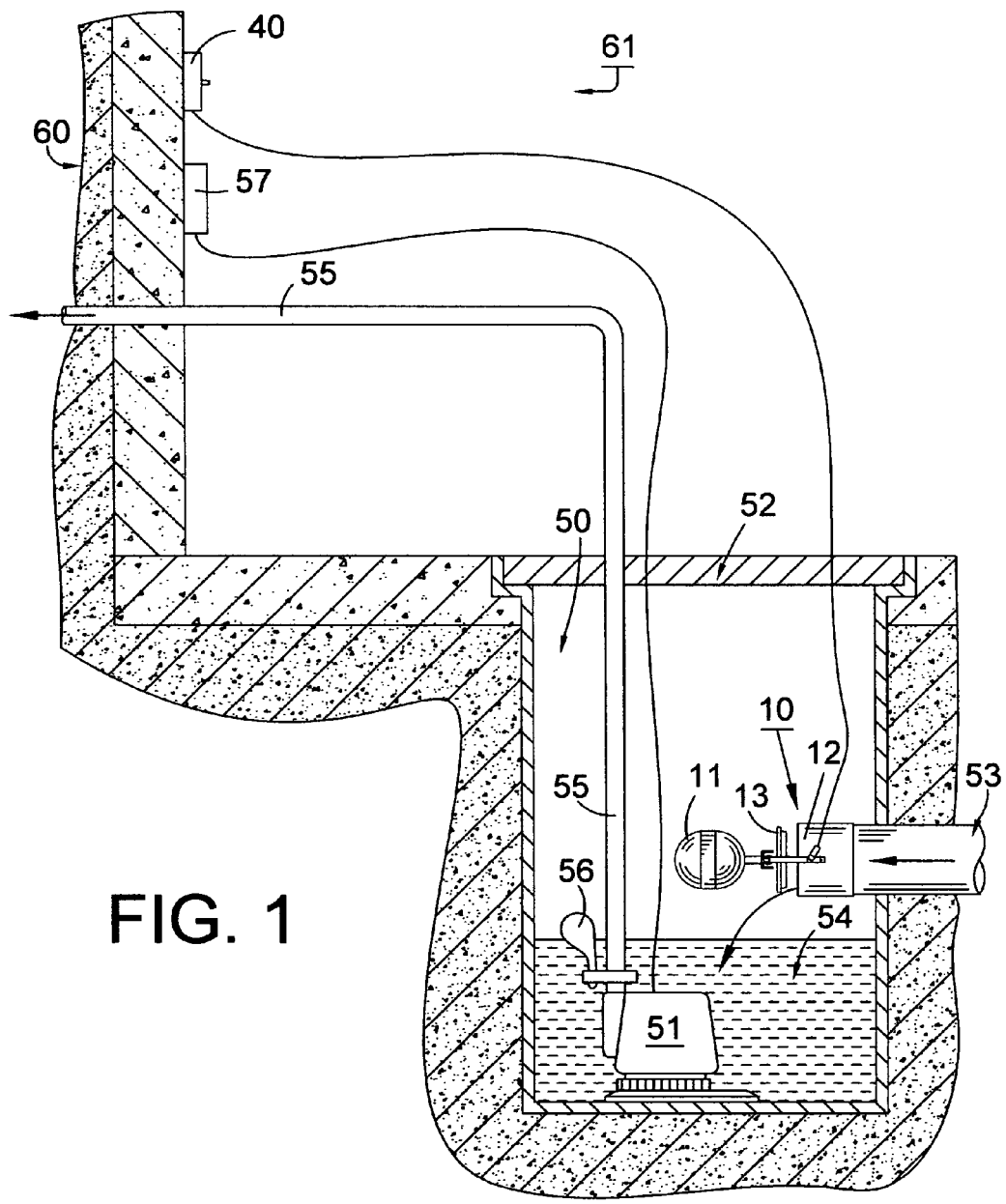
FIG. 1 shows a schematic view of the float valve of the invention as positioned in a sump pit with the attached alarm.

For a better understanding of the invention and its operation, turning now to the drawings, sump pit 50 is shown in FIG. 1 in basement 61 of a house or building 60. Sump pit 50 is covered by lid 52 and contains sump pump 51. Drain pipe 53 provides water 54 which in turn is pumped from sump pit 50 through outlet pipe 55 to an area outside of building 60. As depicted in FIG. 1, float 56 of sump pump 51 is lifted by the level of water 54 to normally activate sump pump 51. However, for any of a variety of reasons, pump 51 may not operate. If so, water 54 continuing to flow through drain pipe 53. Thus, if float valve 10 were not in place, basement 61 could easily flood as the water level in sump pit 50 rises above sump pit lid 52.

Sump pump 51 is electrically connected to junction box 57 and alarm 40 of float valve 10 also shown in FIG. 1. As would be understood, if sump pump 51 in FIG. 1 is not working, water 54 continues to rise in sump pit 50 to the potential detriment of building 60.

Figure 2:
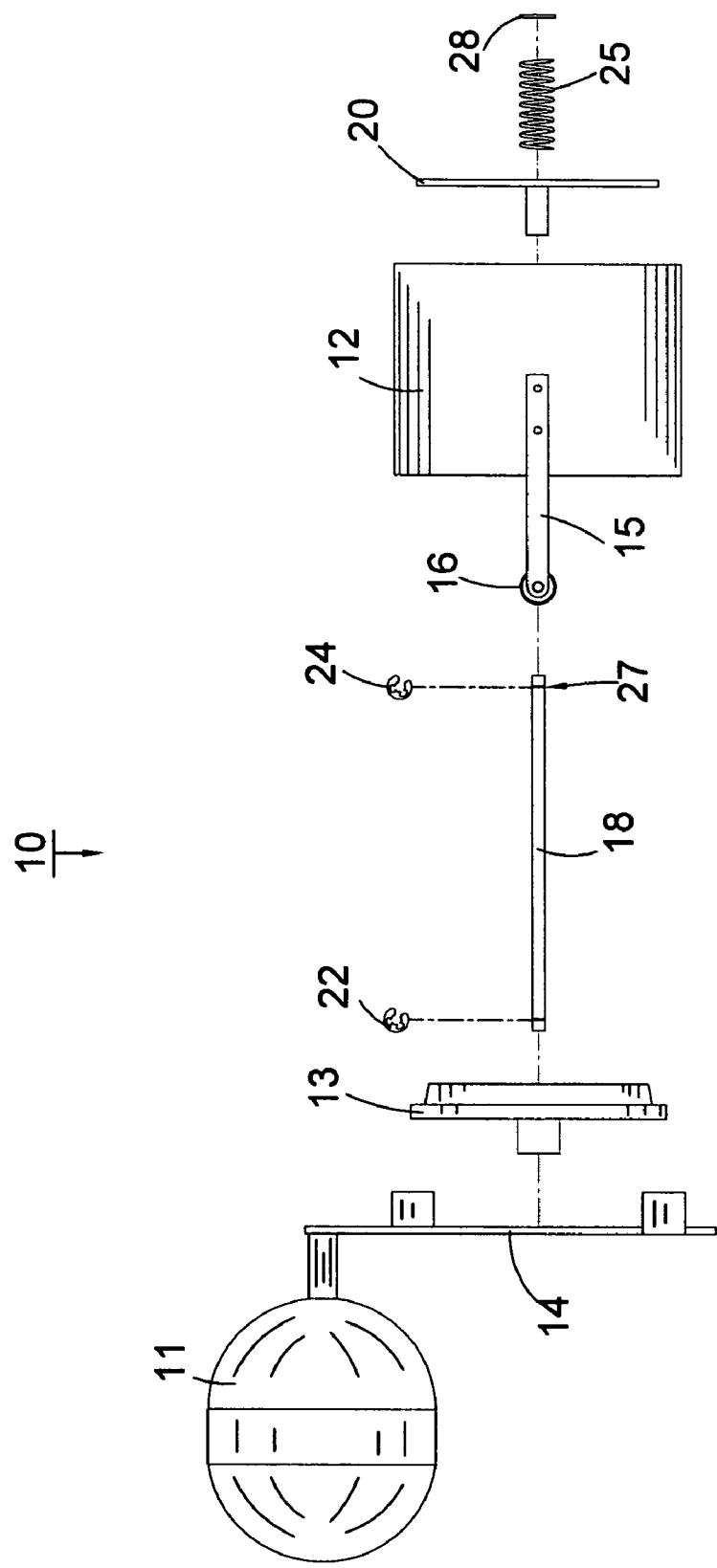
FIG. 2 demonstrates an exploded view of the float valve without the alarm.
Figure 6:
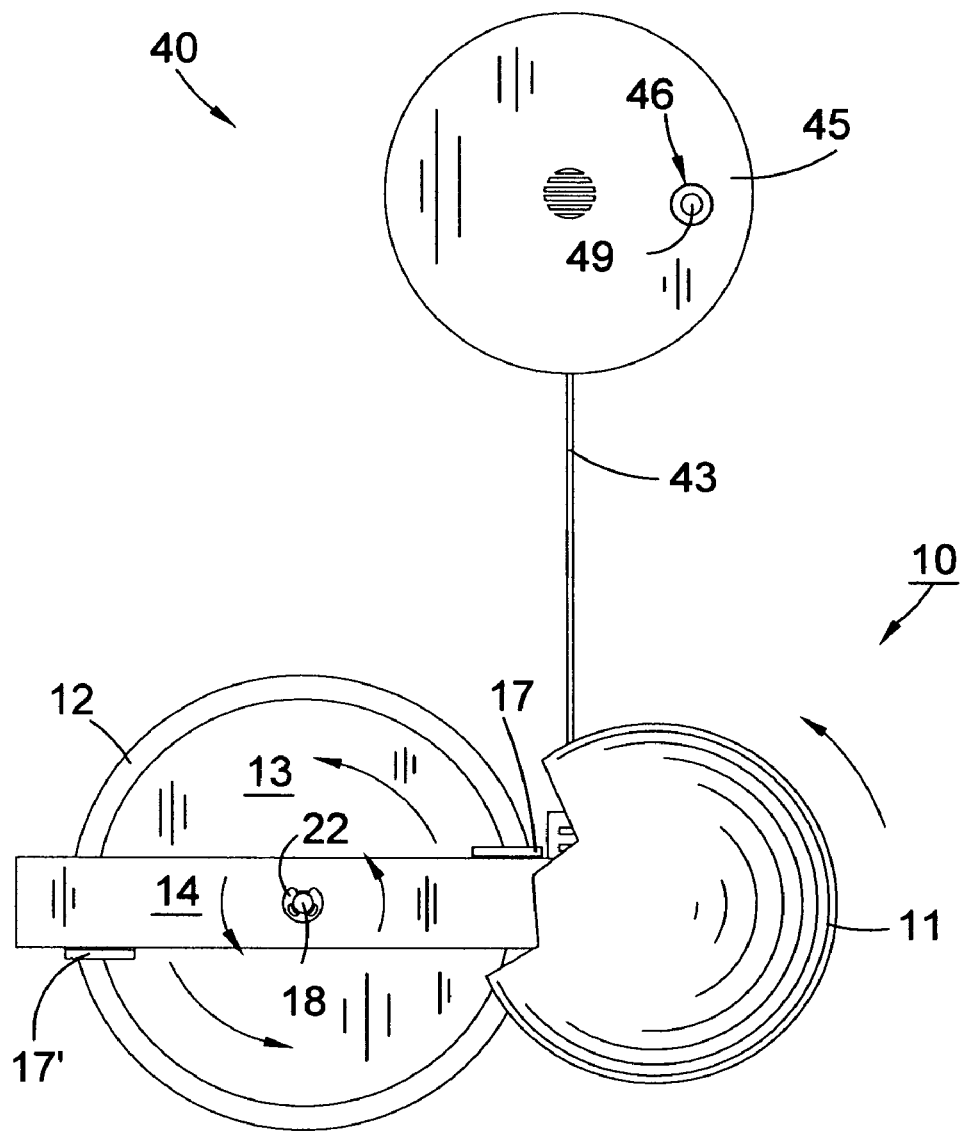
FIG. 6 shows a front elevational view of the float valve open with the float seen partially cut-away.
Figure 7:
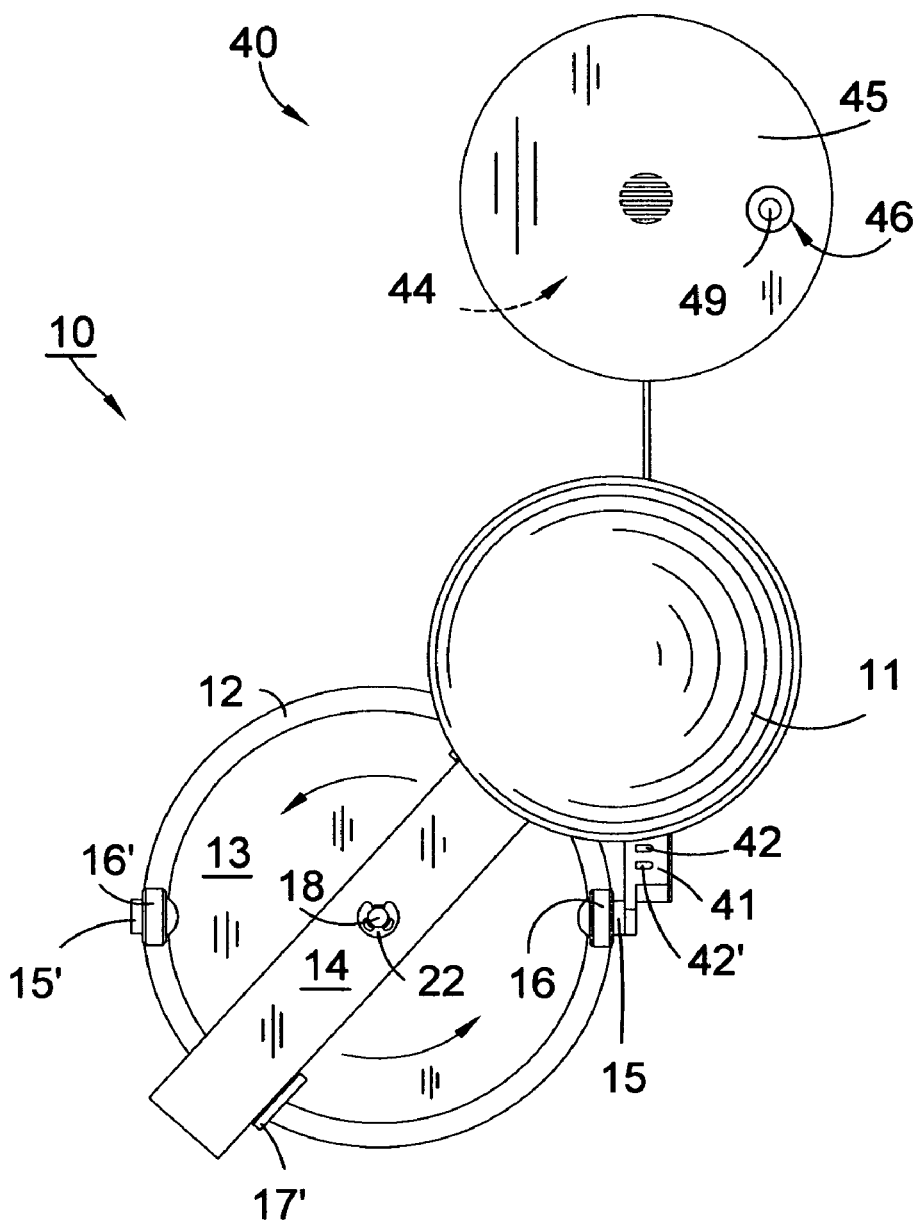
FIG. 7 depicts a front elevational view of the float valve in a closed posture.
Figure 8:
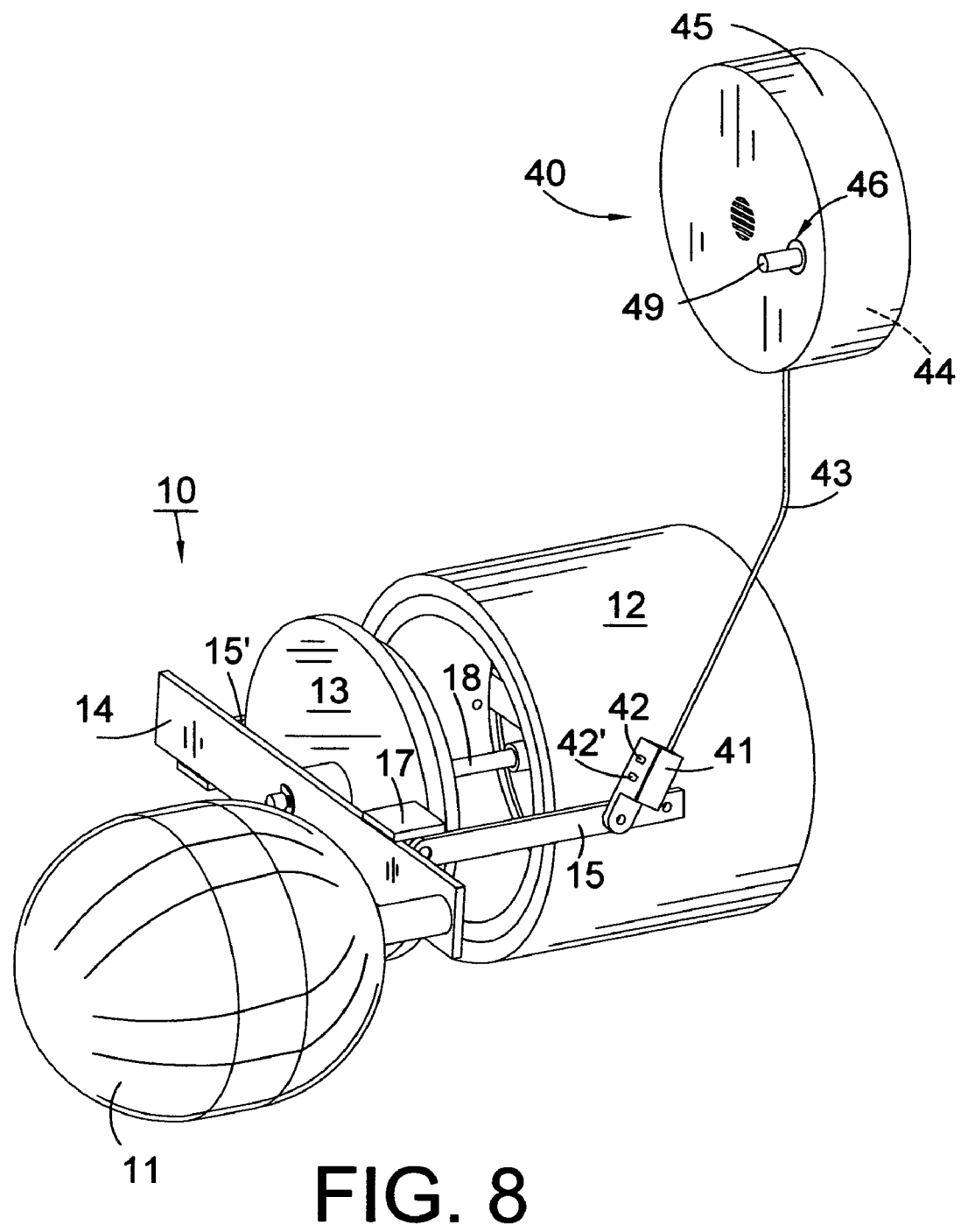
FIG. 8 illustrates a perspective view of the open float valve.

Water 54 rising in sump pit 50 may eventually contact float 11. Float valve 10 in FIG. 1 is normally open as also shown in FIGS. 4, 6 and 8. As would be understood, water from drain pipe 53 passes through conduit 12 affixed thereto to collect in sump pit 50 while valve cap 13 remains open. Once rising water 54 strikes float 11, float 11 begins to lift and rotate in a counterclockwise direction as shown in FIG. 6 causing float arm to also rotate in a counterclockwise direction. When normally open, float arm 14 is supported by struts 15, 15' shown in FIGS. 7 and 8 which distal ends of struts 15, 15' each have a roller 16, 16' positioned respectively which float arm 14 rests thereon. Roller stops 17, 17' stabilize float arm 14 and prevent clockwise motion of float arm 14. Thus as seen in FIG. 8, cap 13 is spaced from conduit 12 and float 11 which is attached to float arm 14 can only rotate in a counterclockwise direction due to depending roller stops 17, 17' (FIGS. 6 and 8). As float 11 is lifted as shown in FIG. 7, float arm 14 disengages from rollers 16, 16'. Shaft 18 which consists of a rigid steel rod is affixed to cap 13 and float arm 14 by steel spring clips 22 as shown in FIG. 2. Shaft 18 is mounted centrally of conduit 12 as shown, for example in FIG. 4, and passes through axle guide 20. Resilient member 25 which consists of a coil spring is affixed to shaft 18 as best seen in FIG. 4. Steel clip 24 engages groove 27 on the terminal end of shaft 18 to retain washer 28 upon which spring 25 rests. As would be understood, when lid 13 is in an open posture as seen in FIG. 8 resilient member 25 (FIG. 4) is compressed by axle guide 20 and bias is applied to shaft 18. Once float arm 14 is released from rollers 16, 16', resilient member 25 expands to its normal, relaxed and elongated position thereby urging shaft 18 from left to right generally shown in FIGS. 3 and 8 to thereby close valve 10 by bringing cap 13 into sealing contact with the open end of conduit 12 to thus close valve 10. With valve 10 closed no further water will be permitted to pass from drain pipe 53 into sump pit 50, thereby preventing basement 61 from flooding.

Figure 3:
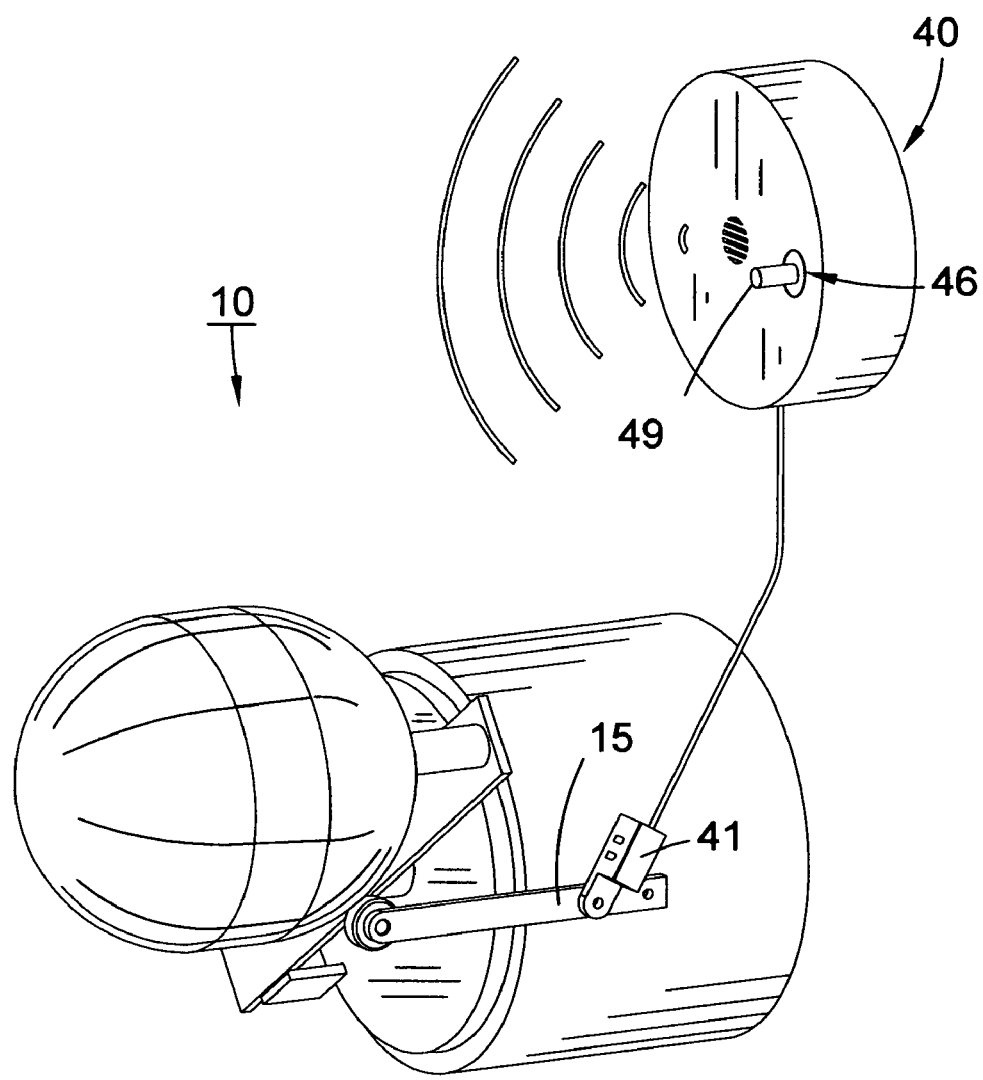
FIG. 3 illustrates the float valve and alarm in enlarged fashion as removed from a drain pipe.
Figure 4:
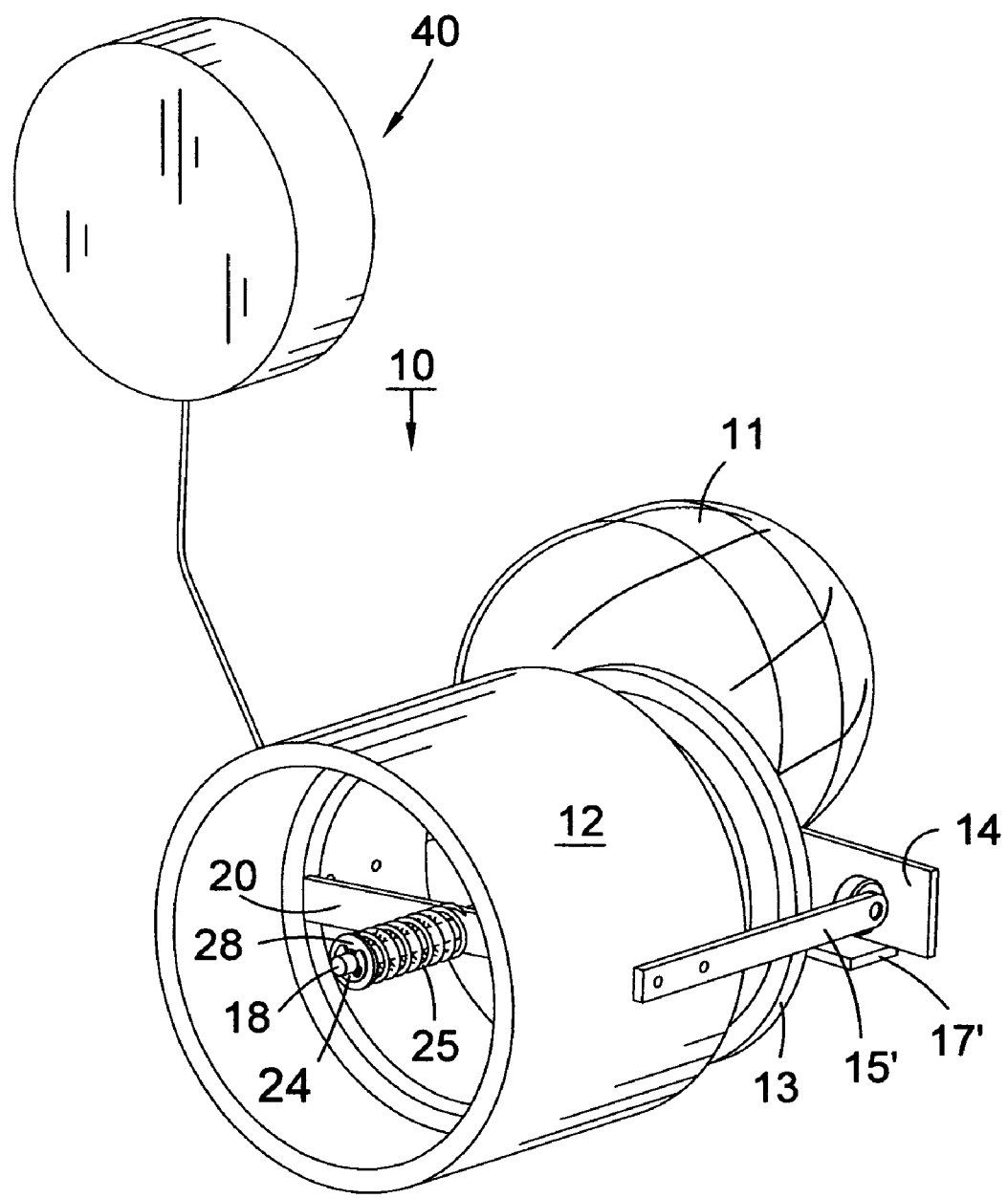
FIG. 4 features a rear perspective view of the float valve and alarm as seen in FIG. 3.
Figure 5:
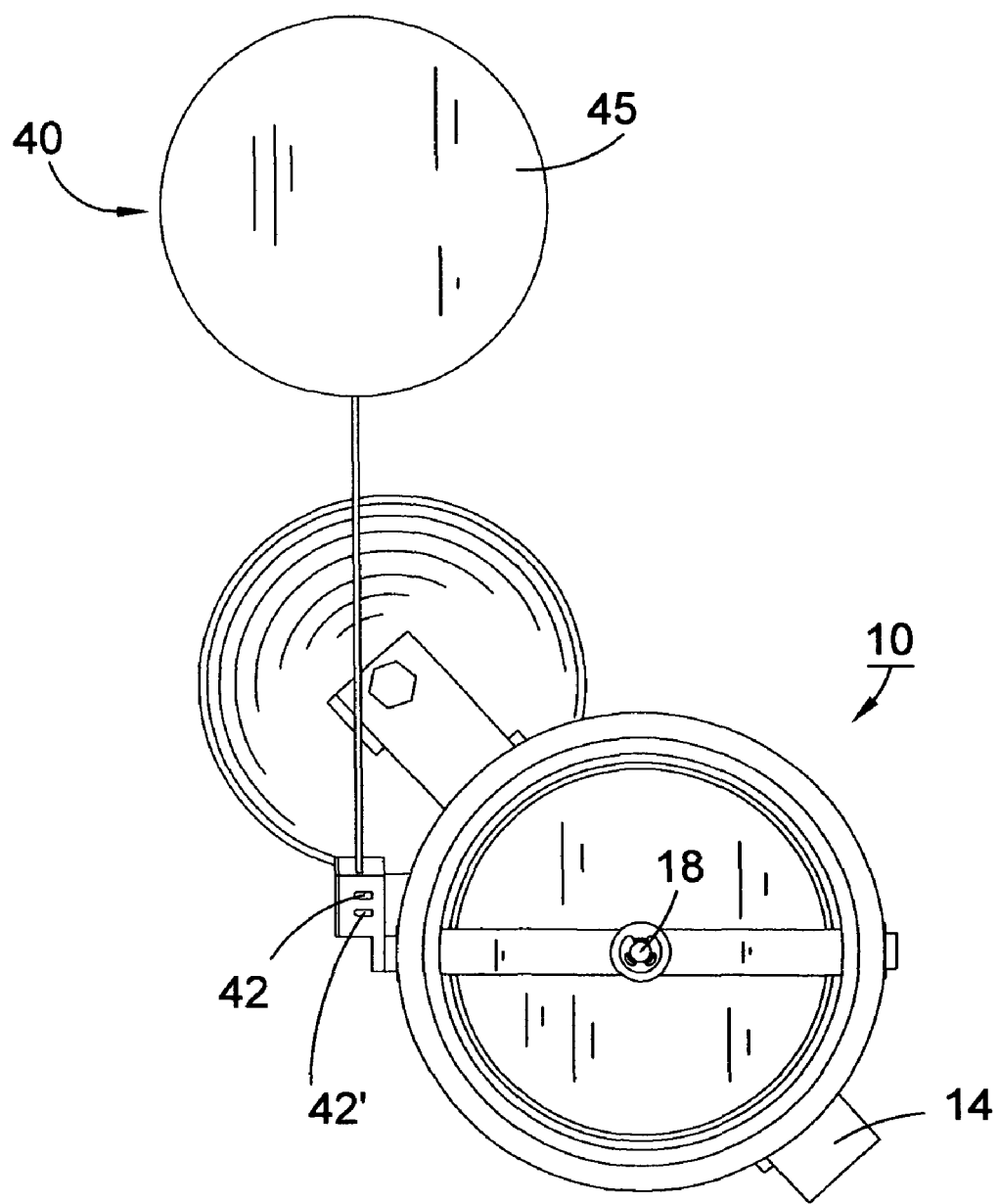
FIG. 5 pictures a rear elevational view of the float valve and alarm as seen in FIG. 3.

Water sensor 41 as shown in FIGS. 3, 7 and 8 displays ends 42, 42' of two line electrical conductor 43. Alarm circuitry 44 (not shown) contained within housing 45 is connected to an audible buzzer (not shown) also in housing 45. The alarm circuitry 44 has a power source (not shown) which includes a battery (not shown). Alarm circuitry 44 is conventional circuitry as found in a typical smoke alarm as illustrated in U.S. Pat. No. 4,246,572. Other standard smoke alarm circuitry could likewise be utilized. Each conductor of two line conductor 43 is connected to a different pole of test switch 46. By pressing external button 49 on housing 45 buzzer 47 (not shown) of alarm circuitry 44 is activated, causing an audible signal to warn building occupants. Alarm 40 will sound by either depressing test button 49, sensing smoke in basement 61 or by water sensor 41 should water sensor 41 become submerged.

The preferred method of operation of float valve 10 closes the end of drain pipe 53 as cap 13 seals the end of conduit 12. Float 11 lifts due to a rising water level in sump pit 50, thus causing float arm 14 to disengage rollers 16, 16' as it rotates. Once disengaged, float arm 14 which is joined to shaft 18 is urged through conduit 12 towards drain pipe 53 and resilient member 25 expands. Shaft 18 is also joined to cap 13 which then seals conduit 12, preventing water 54 flow into sump pit 50. Simultaneous therewith, water sensor 41 is "made" and an audible alarm is generated from alarm housing 45.

The illustrations and examples provided herein are for explanatory purposes and are not intended to limit the scope of the appended claims.

I claim:

1. A float valve comprising:
   a) a liquid conduit;
   b) a shaft, said shaft positioned within said conduit, a first strut, a roller, said roller mounted on said first strut, said first strut affixed to said conduit;
   c) a cap, said cap positioned on said shaft for closing said conduit; and
   d) a float, a float arm, said float arm rotatably mounted on said shaft and joined to said cap, said float attached to said shaft, wherein said roller abuts said float arm when said cap is in the fully open position and wherein lifting said float will cause said cap to close said conduit.

2. The float valve of claim 1 further comprising an additional strut, said additional strut affixed to said conduit in opposing relation to said first strut.

3. The float valve of claim 1 further comprising a roller stop, said roller stop attached to said float arm.

4. The float valve of claim 1 wherein said float arm is positioned on said roller to support said cap in the open position.

5. The float valve of claim 1 further comprising a resilient member, said resilient member attached to said shaft for biasing said shaft.

6. The float valve of claim 5 wherein said resilient member comprises a coil spring.

7. The float valve of claim 1 further comprising a shaft guide, said shaft guide attached to said conduit, said shaft guide defining an aperture, said shaft passing through said shaft guide aperture.

8. The float valve of claim 1 further comprising an alarm, said alarm comprising a housing, electrical circuitry, said electrical circuitry contained within said housing, a test switch, said test switch connected to said electrical circuitry, a smoke sensor, said smoke sensor connected to said electrical circuitry, a water sensor, said water sensor connected to said electrical circuitry whereby said alarm can be activated by smoke, water or by said test switch, said water sensor mounted on said first strut.

9. The float valve of claim 8 further comprising an audible buzzer, said buzzer connected to said electrical circuitry.

10. The float valve of claim 8 further comprising a power source, said power source attached to said electrical circuitry.

11. The float valve of claim 10 wherein said power source comprises a battery.

12. A method of closing the end of a drain pipe that empties liquid into a sump pit, the method including the stops of:
   a) providing a float valve having a liquid conduit, a shaft positioned within the conduit, a spring attached to the shaft, a first strut, a roller mounted on the first strut, the first strut affixed to the conduit, a cap positioned on the shaft for closing the conduit, a float, a float arm rotatably mounted on the shaft and joined to the cap, the float arm for engaging the roller when the cap is open;
   b) attaching the conduit of the float valve to the drain pipe;
   c) allowing the sump pit to receive liquid through the drain conduit;
   d) lifting the float with the liquid to rotate the cap along the shaft;
   e) disengaging the float arm from the roller; and
   f) urging the cap against the drain conduit with the spring to close the drain conduit.

13. The method of claim 12 wherein allowing the sump pit to receive liquid comprises the step of allowing the sump pit to receive water from a drain pipe joined to the conduit.

\* \* \* \* \*